July 21, 1925.
S. APOSTOLOFF
1,546,461
DRY CELL
Filed Dec. 16, 1919
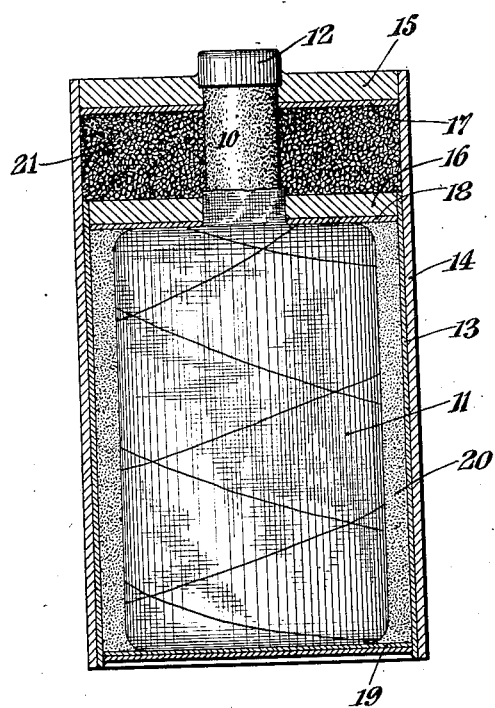
Inventor
Serge Apostoloff
By his Attorneys
Williams & Pritchard Patented July 21, 1925.

1,546,461

UNITED STATES PATENT OFFICE.

SERGE APOSTOLOFF, OF NEW YORK, N. Y.

DRY CELL.

Application filed December 16, 1919. Serial No. 345,212.

*To all whom it may concern:*

Be it known that I, SERGE APOSTOLOFF, a subject of the King of Great Britain, residing in the borough of Manhattan, city, county, and State of New York, have invented certain new and useful Improvements in Dry Cells, of which the following is a specification.

My invention relates to dry cells and batteries for use in flash-lights and the like, particularly to that type of cell employing a paste electrolyte and having a container electrode; and has for its object provision of a cell unit particularly adapted for easy battery assemblage; such unit being free of difficulties incident to creeping salts. Various types of such cells have been heretofore devised but most of them suffered from the deleterious effects of creeping salts and local short circuiting. In most of the cells heretofore used, an electrode of zinc formed the container for the electrolyte, and the metal electrode extended to the extreme top of the cell where it is sealed. The container is a zinc can with its top above the level of the "bobbin" formed by a jacket of manganese dioxid, etc., carried by an axial carbon rod. This rod is of about the same height as the can. Over the bobbin is placed a cardboard washer and sealing material is cast in to fill above it to the top of the can. In so doing, the top edge of the can is in the top plane of the complete unit. Owing to the poor adhesion between the zinc and the sealing material, (generally wax, pitch, etc.) there is, or tends to be, a seam therebetween and it was found that the electrolyte salts after a certain period of time would creep along the inner zinc surface of the container and finally work their way above the seal, thereby loosening the latter and corroding the contact terminal. There was also the possibility of a short circuit or leakage across the top surface of the sealing wax. Furthermore, when such cells were contained in flash-light receptacles, the escaping salts corroded the metallic parts of the receptacles and thereby injured them to a greater or less extent.

I have discovered that if the container electrode is enclosed within a non-conducting outer shell of paper or the like which shell is so constructed that it extends a substantial distance above the zinc electrode thereby forming a chamber or space above the level of the top edge of the zinc can, and if the cell is hermetically sealed at the top of said paper shell, salt-creepage will be stopped and consequently the seal will remain tight and corrosion be entirely prevented. While the adherence of sealing wax and the like to zinc is not always sufficient to give a perfect seal, no such difficulty exists with paper.

One object of my invention is to so construct a cell that a surface of water proofed paper or other "non-creeping" material will be in the path of the creeping salts, to act as an obstacle, impediment, barrier, insulation, dam, or barricade thereto.

A further object of my invention is to prevent the usual short circuiting or electric leakage between the carbon and the zinc in the open chamber above the electrolyte of the ordinary dry cell, through effluvia laden with ammonia given off by the electrolyte. Currents so occurring though feeble in strength may prove quite detrimental in the course of time when the cell is kept on the shelf or on open circuit.

In the use of the old type of cell it was found that the zinc surface above the electrolyte was often oxidized in time. A zinc-zinc oxide couple was thereby created. With my construction there is no air in contact with the inner surface of the zinc electrode, and hence no zinc-zinc oxide couple can possibly be formed.

My invention may be practiced in various ways and the construction shown in the accompanying drawings and now to be described will serve as an illustration of one preferred form of cell, embodying the invention.

The figure shows a vertical sectional view of the cell.

Referring now to the drawing, wherein similar reference characters refer to similar parts, the bobbin or cathode element comprises the carbon electrode 10, the depolarizing mass 11, and the upper terminal cap 12, preferably of brass. The bobbin is suspended within the container electrode 13, preferably of zinc, and the outer shell 14, (which is of non-conducting "non-creeping material," such as water-proofed paper or the like), by means of the spaced transverse seals 15 and 16, preferably of pitch, paraffine or the like, and the insulation washers 17 and 18, preferably of fibrous material, located below said seals. The pasty electrolytic mass 20 surrounds the bobbin and, as shown, fills the zinc container electrode 13. For the purpose of insulation the washer 19 of non-conducting material is provided in the bottom of the container electrode 13. It will be noted that the zinc electrode 13 is considerably shorter than the outer shell 14 and that the axial carbon rod in the bobbin extends considerably above the top of the lower seal 16, permitting a longitudinal spacing of the two seals 15 and 16 and thereby providing an air chamber therebetween. As shown, the bottom 19 which in use serves as the negative pole is somewhat recessed or cupped for convenience in assembling or stacking cell units end-to-end to form a battery. The top seal 15 is not in contact with zinc cup 13 and forms no seal therewith. Instead it seals with the container 14 of waterproofed paper. In the chamber between the seals 15 and 16 sand, sawdust, rice hulls or other like filling material 21 may be packed. This material assists in holding the upper washer in proper position. This filling material is not absolutely essential however and may be omitted if desired.

In the use of my improved cell, even though some of the electrolytic salts after a considerable period of time may work up beyond the joint between the zinc electrode and the seal 16, any further climbing of these salts will be prevented by reason of the creepage impeding surface in the path of the salts above the seal 16 and the top edge of the zinc electrode 13. It will be thus evident that it will be impossible for the joint between the upper seal 15 and the container 14 to be in any manner weakened, and that no corrosion either of the brass terminal 12 or of the metal parts of a flashlight receptacle can occur.

A further advantage of my improved cell with its short zinc electrode container and long carbon rod is that where a plurality of such cells are placed end to end, the zinc of one cell can under no circumstances contact with the zinc of an adjacent cell and cause a short circuit. Hence the high degree of precision ordinarily required in the manufacture of the zinc containers is not necessary, as no short circuit from this cause can result when using my cells.

A still further advantage of my improved type of cell is the great saving of zinc which is accomplished (about 20%) without in any way impairing the total available amperage capacity.

My invention is obviously not limited to the use of a cell having a paste electrolyte, it being clearly within its spirit and general scope to employ a liquid electrolyte. It is also to be understood that the invention is not to be limited in any way to the example herein disclosed, but may be practiced in various other ways.

Having described my invention, what I desire to claim as new is:

1. In a dry cell, a zinc cup-shaped electrode containing a bobbin and an electrolyte the lower portion of said electrode forming a terminal, an outer fibrous container surrounding the zinc electrode and extending above the top edge thereof, a seal closing the opening to the zinc electrode and a second seal located above and spaced away from the first seal and the zinc and closing the opening of the fibrous container.

2. In a dry cell, a zinc cup-shaped electrode containing a bobbin and an electrolyte the lower portion of said electrode forming a terminal, an outer container of insulating material surrounding the zinc electrode and extending above the top edge thereof, a seal closing the opening to the zinc electrode and a second seal located above and spaced away from the first seal and the zinc and closing the opening of the fibrous container.

3. In a dry cell, an outer shell of insulating material, a cup shape zinc electrode shorter than the outer shell and located in the lower part thereof and having its bottom forming a terminal, a bobbin and electrolyte in said zinc electrode, and a seal of pitch closing the upper end of said outer shell and a substantial distance above the zinc electrode.

4. In a dry cell, an outer shell of insulating material, a cup shaped zinc electrode shorter than the outer shell and located in the lower part thereof and having its bottom forming a terminal, a bobbin and electrolyte in said zinc electrode, and a seal closing the top of the zinc electrode and a second seal located above closing the opening of the outer shell.

5. In a dry cell, an outer shell of insulating material, a cup shape zinc electrode shorter than the outer shell and located in the lower part thereof and having its bottom forming a terminal, a bobbin and electrolyte in said zinc electrode, a seal closing the zinc electrode, and a seal spaced above said first mentioned seal closing the outer shell.

6. In a dry cell, an outer shell of insulating material, a cup shape zinc electrode shorter than the outer shell and located in the lower part thereof and having its bottom forming a terminal, a bobbin and electrolyte in said electrode, a seal closing said electrode, a seal of pitch spaced from said first mentioned seal and sealing with said outer shell, a filling of absorbent material between said second and last mentioned seals and a pole extending from said bobbin through said seals and the intervening space and extending above the surface of the top seal, said pole being adapted to make contact with the zinc bottom of a similar cell.

7. In a dry cell, an outer shell of insulating material, a cup shaped zinc electrode the bottom of which forms a terminal for said cell, a bobbin and electrolyte in said electrode, the side walls of said electrode extending a distance below the bottom thereof, spaced seals for said electrode and outer shell forming an air chamber therebetween, and a carbon element extending above the level of the upper seal.

8. In a dry cell of the type described, a container electrode the bottom of which constitutes one terminal of the cell, a second electrode located within said container electrode and an outer shell, the top edge of said outer shell extending a vertical distance substantially above the top edge of the container electrode.

9. In a dry cell, a zinc electrode forming a container and having an exposed plane bottom forming a terminal, a bobbin located within said electrode and carrying a pole extending through the top plane of the cell, an outer container of insulating material surrounding the zinc electrode, and a top sealing member of insulating material for said cell above the top of said electrode, with but the one pole carried by the bobbin appearing on the surface of said top sealing member.

10. In a dry cell, a can-like zinc electrode containing electrolyte and having a height materially less than that of the cell as a whole, said electrode having an exposed plane bottom forming a terminal, an outer container of insulating material surrounding the zinc electrode, a bobbin within said zinc electrode and carrying a pole extending through the top of the cell and a top sealing member for said cell.

11. In a dry cell, a relatively low can-like zinc electrode containing a bobbin and electrolyte, said electrode having an exposed plane bottom forming a terminal, and having its side walls extending a distance below said bottom, and an outer container surrounding the zinc electrode and extending thereabove a substantial distance and a top seal for said container carrying a pole extending to said bobbin, said pole being adapted to contact with the zinc bottom of a similar cell.

In testimony whereof, I have affixed my signature to this specification.

SERGE APOSTOLOFF.